June 27, 1939.  F. F. KIEMLE  2,163,949

RUBBER HOLDER FOR CYMBALS

Filed Dec. 6, 1937

INVENTOR.
FREDERICK F. KIEMLE
BY McConkey, Dawson, & Fax
ATTORNEY.

Patented June 27, 1939

2,163,949

UNITED STATES PATENT OFFICE 2,163,949

RUBBER HOLDER FOR CYMBALS

Frederick F. Kiemle, Elmwood Park, Ill., assignor to C. G. Conn, Ltd., Elkhart, Ind., a corporation of Indiana Application December 6, 1937, Serial No. 178,208

3 Claims. (Cl. 84—422)

This invention relates to cymbals and the like, and particularly to holders for articles such as cymbals.

An object of the invention is to provide cymbal holding means comprising a resilient rubber member slipped over the cymbal support and through the central portion of the cymbal. This is advantageous in the ease with which a cymbal may be mounted on and removed from such holding means, and in the inexpensive and economical manner of making and using such a holder.

The above and other objects and features of the invention will be apparent from the following description of the illustrative embodiment shown in the accompanying drawing in which.

Figure 1:
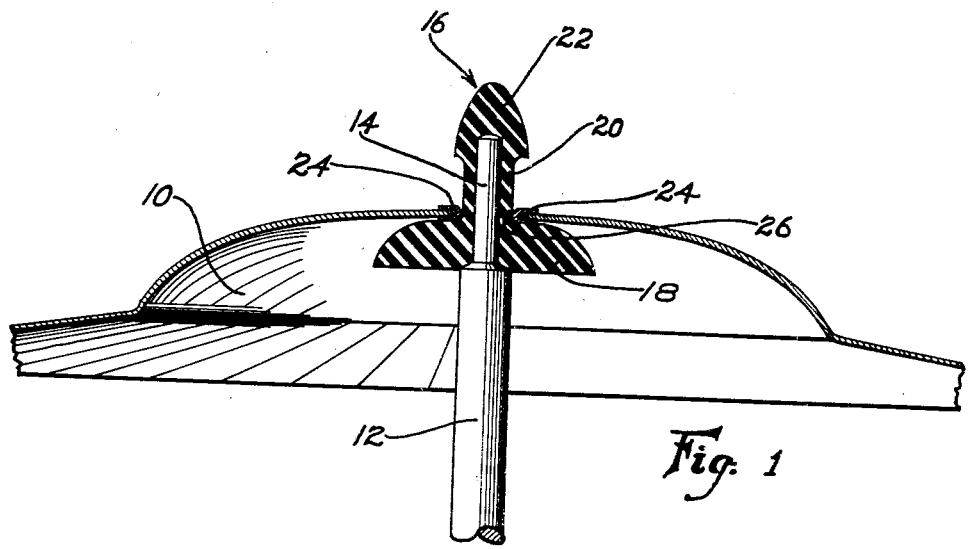
Figure 1 is a vertical central section showing my novel holding means inserted over the cymbal bracket and supporting the cymbal.

In the arrangement shown in Figure 1 a cymbal 10 is supported on a vertical bracket member 12 which is attached to a drum or the like in the trap-drummer's equipment (not shown). The upper end of the vertical bracket support member 12 is decreased in diameter as shown at 14 so as to permit the sliding over it of a rubber holding member 16.

Figure 2:
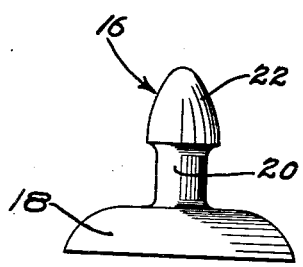
Figure 2 is a side elevation of my novel rubber holding means for the cymbal.
Figure 3:
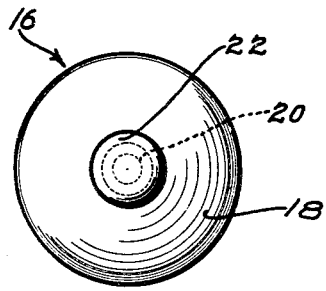
Figure 3 is a plan view of my novel rubber holding means.

The rubber holding member 16, as shown in side elevation in Figure 2 has its lower end formed with a large outward flange 18, having a spherical upper surface, a decreased intermediate cylindrical portion 20 and has at its top point a bullet-shaped end portion 22 whose diameter exceeds that of the intermediate portion 20.

Referring now to Figure 1, the rubber holding member 16 is slipped over and fitted to the decreased portion 14 of the vertical bracket supporting member 12. At the top central portion of the cymbal 10 there is provided a grommet 24 flanged into a central opening 26 of the cymbal 10. The inside diameter of the grommet 24 is smaller than the diameter of the bullet-shaped end 22 but is slightly larger than the diameter of the reduced portion 14 of the bracket supporting member 12. The cymbal 10 is slipped over the bullet-shaped end portion 22 of the rubber holding member 16 through its top central opening in the grommet 24 until it rests upon the flange 18, encircling the decreased portion 20 of the rubber holding member 16. The cymbal rests snugly around the portion 20 of the rubber holding member 16 and is protected from falling off the holder by means of the extended bullet-shaped end portion 22.

While one illustrative embodiment has been described in detail, it is not my intention to limit the scope of the invention to that particular embodiment, or otherwise than by the terms of the appended claims.

I claim:

1. A resilient holder for a cymbal or the like comprising an extended flanged circular lower portion having at the center of its lower face a socket adapted to receive a vertical support and which flange is adapted to support a cymbal resting thereon, a reduced portion projecting upwardly from the center of said flanged portion and adapted to extend through an opening at the center of the cymbal as it rests on the flanged portion, and a somewhat larger bullet-shaped top end portion sufficiently compressible to pass through said opening and which acts to prevent the cymbal from accidentally coming off the holder when the cymbal is struck.

2. Cymbal supporting means including a cymbal bracket support with a decreased top portion, a rubber holding member placed over and supported on the upper end of said portion said rubber holding member having a large extended flange portion at its lower end adapted to support a cymbal, an intermediate reduced portion adapted to pass through an opening in the center of a cymbal resting on the flange portion, and a top end portion whose diameter exceeds the diameter of the intermediate reduced portion and which is sufficiently compressible to pass through said opening in the cymbal.

3. A resilient holder for a cymbal or the like comprising a single piece of moulded rubber formed with an extended flanged lower portion adapted to support a cymbal or the like and formed in its lower face with a socket adapted to be mounted on a support, and having a spherical surface on which the cymbal rests, said holder having a reduced portion projecting upwardly at the center of said spherical surface and adapted to pass through an opening in the central portion of the cymbal.

FREDERICK F. KIEMLE.